United States Patent [19]
Min

[11] Patent Number: 5,572,504
[45] Date of Patent: Nov. 5, 1996

[54] EARLY BRAKE DRIVING METHOD OF DISK SYSTEM AND CIRCUIT THEREOF

[75] Inventor: Kyoung-Seo Min, Suwon, Rep. of Korea

[73] Assignee: Samsung Electronics Co., Ltd., Kyungki-do, Rep. of Korea

[21] Appl. No.: 437,924

[22] Filed: May 9, 1995

Related U.S. Application Data

[63] Continuation of Ser. No. 286,992, Aug. 8, 1994, abandoned, which is a continuation of Ser. No. 42,791, Apr. 6, 1993, abandoned.

[30] Foreign Application Priority Data

Apr. 6, 1992 [KR] Rep. of Korea .................. 92-5672

[51] Int. Cl.⁶ .................. G11B 17/30; G11B 7/00
[52] U.S. Cl. .................. 369/215; 369/124
[58] Field of Search .................. 369/215, 214, 369/124, 44.28, 44.29, 44.32, 54, 44.14, 112, 44.16; 359/814, 824

[56] References Cited

U.S. PATENT DOCUMENTS

| | | | |
|---|---|---|---|
| 4,541,083 | 9/1985 | Maeda et al. | 369/44.28 |
| 4,553,182 | 11/1985 | Narita | 360/85 |
| 4,677,602 | 6/1987 | Okano et al. | 39/44.28 |
| 4,769,803 | 9/1988 | Yamamiya | 369/44.16 |
| 4,785,439 | 11/1988 | Okado et al. | 369/44.28 |
| 4,866,687 | 9/1989 | Kasai et al. | 369/44.11 |
| 4,942,567 | 7/1990 | Shiba | 369/44.29 |
| 5,138,593 | 8/1992 | Yokoyama | 369/44.32 |
| 5,157,642 | 10/1992 | Tsukamura et al. | 369/32 |
| 5,184,338 | 2/1993 | Shimoda et al. | 369/44.32 |

FOREIGN PATENT DOCUMENTS

| | | | |
|---|---|---|---|
| 60-59543 | 4/1985 | Japan | 369/44.28 |
| 61-92438 | 5/1986 | Japan | 369/44.28 |
| 61-180940 | 8/1986 | Japan | 369/44.28 |
| 2-165427 | 6/1990 | Japan | |

*Primary Examiner*—Stuart S. Levy
*Assistant Examiner*—Allen Cao
*Attorney, Agent, or Firm*—Sughrue, Mion, Zinn, Macpeak & Seas

[57] ABSTRACT

A swift deceleration method of a disk system and a circuit thereof such as an Optical Disk Driver, Compact Disk Player, CD-ROM and the like, which can quickly control a vibrating lens support when the optical pickup has been stopped, is disclosed, thus enabling the disk system to switch tracks faster. The method forces the transition of a deceleration circuit from an unlock state to a lock state when the feed motor is stopped, moves the optical pickup in a radial direction and controls the vibration of a lens support during stoppage of the optical pickup by operating the feed motor in a deceleration mode when the feed motor is in transition from the unlocked state to the locked state.

6 Claims, 4 Drawing Sheets

FIG. 1
PRIOR ART
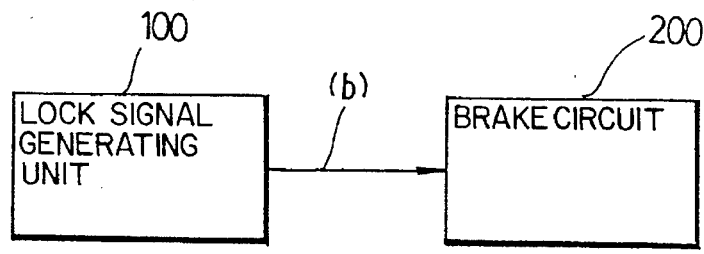
FIG. 2(a) PRIOR ART  FEED MOTOR DRIVING SIGNAL
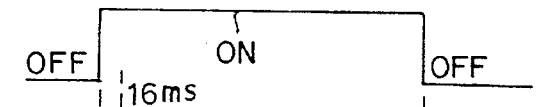
FIG. 2(b) PRIOR ART  LOCK SIGNAL
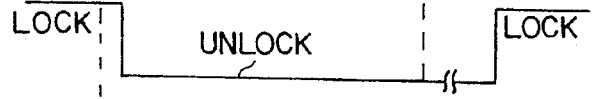
FIG. 2(c) PRIOR ART  PICK-UP CONDITION
FIG. 2(d) PRIOR ART  LENS CONDITION
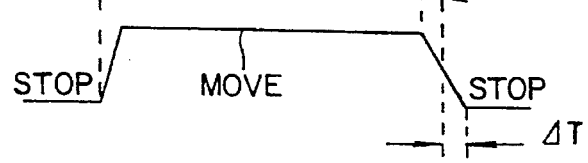

FIG. 3
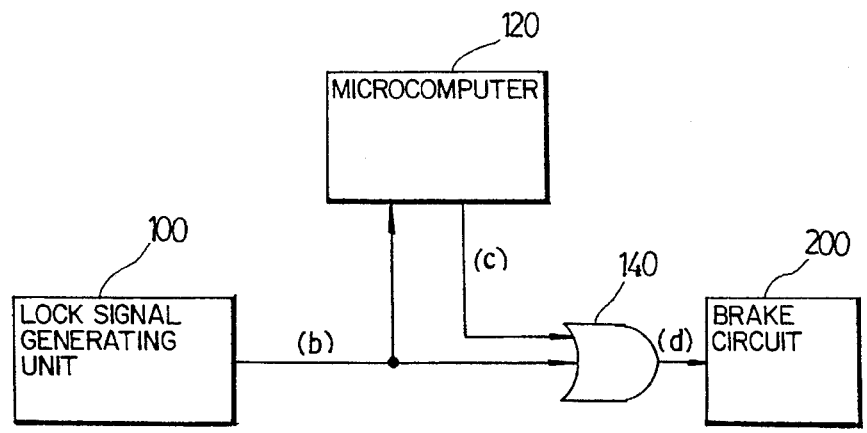
FIG. 4(a) FEED MOTOR DRIVING SIGNAL 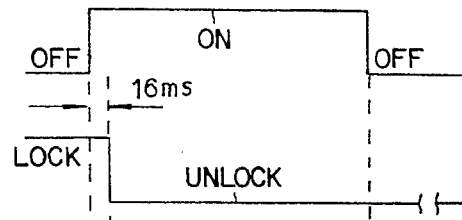
FIG. 4(b) LOCK SIGNAL 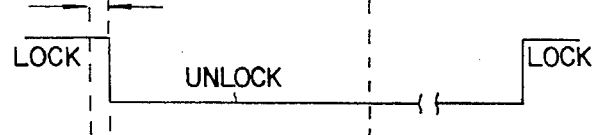
FIG. 4(C) BRAKE DRIVING SIGNAL 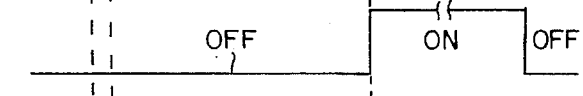
FIG. 4(d) LOGIC MEANS SIGNAL 
FIG. 4(e) PICK-UP CONDITION 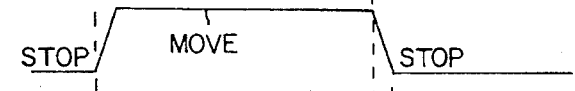
FIG. 4(f) LENS CONDITION 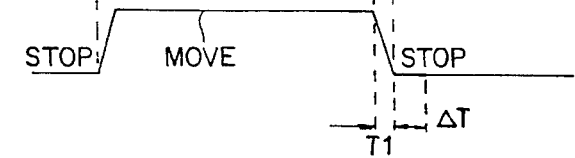

ary of the Invention

EARLY BRAKE DRIVING METHOD OF DISK SYSTEM AND CIRCUIT THEREOF

This is a continuation of application Ser. No. 08/286,992 filed on Aug. 8, 1994, which is a continuation of application Ser. No. 08/042,791 filed Apr. 6, 1993, both now abandoned.

BACKGROUND OF THE INVENTION

1. Field of the Invention

The present invention relates to an early brake driving method of a disk system and a circuit thereof such as an Optical Disk Driver, Compact Disk Player, CD-ROM, CD-XA, CD-1 and the like, and more particularly to an early brake driving method of a disk system and a circuit thereof which can control a lens vibration early during a stoppage of a pickup to thereby cause an early tracking, so that a high access can be made possible.

2. Description of the Prior Art

Generally, because a large capacity of digital information are stored in a disk of a disk system, a fast pickup driving should be realized and a swift tracking should be realized as well.

However, when the pickup is moved and stopped as in a track seek, the pickup has a drawback in that it slips due to inertia or the lens on the pickup vibrates to thereby disable the tracking from realizing quickly.

FIG.1 is a drawing of a conventional brake driving circuit having the aforesaid drawback.

In FIG. 1, a lock signal generating unit 100 outputs lock signals when a Constant Linear Velocity CLV is realized, and when the CLV is not realized, outputs unlock signals.

A brake circuit 200 is carried into a brake mode to thereby perform the tracking when the lock signals are outputted from the lock signal generating unit 100, and when unlock signals are outputted, the brake circuit does not perform the tracking due to a release of the brake mode.

In other words, during a normal reproduction, because the CLV is realized, the brake circuit is changed into a brake mode for performance of the tracking, however when the pickup is moved to radiant directions as in the track seek, the CLV is not realized to thereby release the brake mode, so that the tracking is not conducted.

FIGS. 2a–2d are timing drawings for explaining operational states of FIG. 1.

First of all, when a feed motor driving signal is outputted ON in order to move the pickup to radiant directions of the disk as in FIG. 2a during the track seek, the lock signal generating unit 100 transmits the lock signals to unlock signals to thereby output the same after a predetermined time (around 16 ms) is passed as shown in FIG. 2b because the CLV has not been realized.

Henceforth, even though the feed motor driving signal (see FIG. 2a) is rendered off, the lock signal generating unit 100 keeps outputting unlock signals as illustrated in FIG. 2b, and outputs lock signals when the CLV is realized.

Meanwhile, when the feed motor driving signals are outputted ON as illustrated in FIG. 2a, the pickup and lens move as illustrated in FIG. 2d, and when the feed motor driving signals are turned off, the pickup and the lens are stopped.

However, the lens vibrates due to inertia for a predetermined period of time (ΔT) even after the pickup is stopped within a shortest possible period of time T1, causing the tracking not to be realized.

In other words, because the brake circuit 200 comes to an unlock state, which implies that the same is under a release of the brake mode, the tracking is not realized, resulting in a problem that the tracking is not realized quickly during the track seek.

For example, in U.S. Pat. No. 4,942,567 entitled, "Disk Reproducing Method", a method is presented to reduce a track flow appearing due to a track jump or an external shock.

The U.S. Pat. No. 4,942,567 conducts conventional reproducing operations, and when the external shock is inflicted on, and when a first servo circuit is released of the lock state for a predetermined period of time, a second and a third servo circuit are rendered off to thereby reduce the track flow which can happen during a reproducing operation of the pickup.

Furthermore, a tracking actuator is always locked in the vicinity of a neutral point, resulting in a reduction of an amount of correction of the slider.

Even in the braking mode, the tracking servo circuit can quickly be locked.

However, because the aforesaid U.S. Pat. No. 4,942,567 can not either prevent the vibration of the lens from occurring during the track seek when the pickup is stopped, the problem still exists that a fast tracking can not be realized.

In other words, when the pickup stops at an objected place during the seek, the lens vibrates due to the inertia, causing a problem that an object track can not be accessed at a high speed.

SUMMARY OF THE INVENTION

Accordingly, in order to solve the aforementioned problems, it is an object of the present invention to provide an early brake driving method of a disk system and a circuit thereof which enables the tracking to realize early during a seek to thereby make a high speed access possible.

In accordance with one aspect of the present invention, there is provided an early brake driving method of a disk system by which the aforementioned problems can be solved, comprising the steps of:

transmitting an unlock state to a lock state forcibly during a stoppage of a feed motor which moves the pickup from the disk to radiant directions (first step); and controlling a vibration of a lens during the stoppage of the pickup by operating the feed motor in a brake mode when the same is transmitted to the lock state in the above first step (second step).

In accordance with another aspect of the present invention, there is provided an early brake driving circuit of a disk system, the circuit comprising:

a lock signal generating unit which outputs lock signals during a realization of CLV and outputs unlock signals when CLV is not realized;

a microcomputer which outputs brake driving signals from a stoppage of the feed motor for moving the pickup from the disk to radiant directions to a lock state discriminated by a signal outputted from the lock signal generating unit; and a logic means which controls a vibration of the lens by forcibly transmitting the feed motor from an unlock state to a lock state by way of brake driving signals outputted from the microcomputer, so that the feed motor can be operated in a brake mode.

BRIEF DESCRIPTION OF THE DRAWINGS

For fuller understanding of the nature and objects of the invention, reference should be made to the following detailed description taken in conjunction with the accompanying drawings in which:

FIG. 1 is a drawing of a conventional brake driving circuit;

FIGS. 2a–2d are timing drawings for illustrating operational states in FIG. 1;

FIG. 3 is a drawing of a brake driving circuit in accordance with the present invention;

FIGS. 4a–4f are timing drawings for illustrating operational states in FIG. 3;

DETAILED DESCRIPTION OF THE INVENTION

Figure 5:
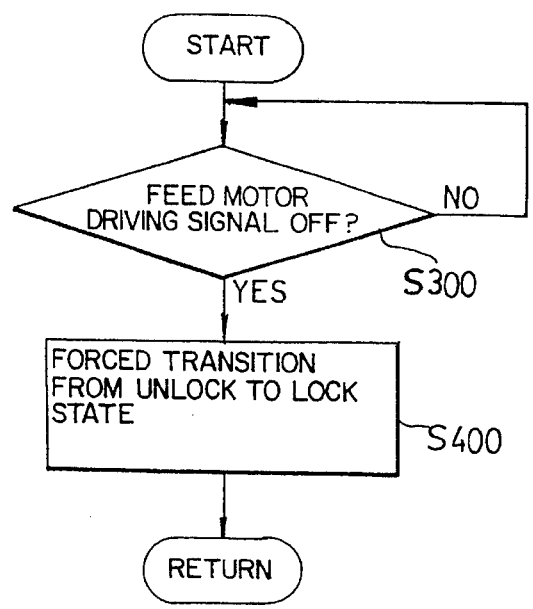
FIG. 5 is a flow chart for illustrating a brake driving method in accordance with the present invention.

FIG. 3 is a drawing of an early brake driving circuit of a disk system in accordance with the present invention.

The early brake driving circuit for a disk system in accordance with the present invention comprises:

a lock signal generating unit 100 which outputs lock signals during a realization of CLV and outputs unlock signals when CLV is not realized;

a microcomputer 120 which outputs brake driving signals from a stoppage of the feed motor for moving the pickup from the disk to radiant directions to a lock state discriminated by a signal outputted from the lock signal generating unit 100; and a logic means 140 which controls a vibration of the lens by forcibly transmitting the feed motor from an unlock state to a lock state by way of brake driving signals outputted from the microcomputer, so that the feed motor can be operated in a brake mode.

In FIG. 3, the lock signal generating unit 100 outputs lock signals when CLV is realized, and outputs unlock singals when the CLV is not realized.

The microcomputer 120 outputs brake driving signals from a stoppage of the feed motor which moves the pickup from the disk to radiant directions to a lock state discriminated by the signals outputted from the lock signal generating unit 100.

The logic means 140 comprises an OR gate and forcibly transmits the unlock state to lock state by way of brake driving signals outputted from the microcomputer 120, so that the brake circuit 200 can be operated in a brake mode to thereby control the vibration of the lens.

In other words, the logic means 140 outputs unlock signals only when the feed motor driving signals are outputted, and outputs lock signals during the stoppage of the pickup, so that the brake circuit 200 can be operated in the brake mode to thereby control the vibration of the lens and to thereafter realize a fast tracking.

The brake circuit 200 is changed into the brake mode during a stoppage of the pickup by lock signals outputted from the logic means 140 to thereby perform the tracking.

FIGS. 4a–4f are timing drawings for illustrating operational states in FIG. 3.

First of all, when the feed motor driving signals are outputted ON in order to move the pickup to radiant directions of the disk during a track seek as illustrated in FIG. 4a, the lock signal generating unit 100 transits lock signals to unlock signals to thereby output after a lapse of a predetermined period of time (around 16 ms) as illustrated in FIG. 4b because CLV has not been realized.

Henceforth, even if the feed motor driving signals (refer to FIG. 4a) are rendered off, the lock signal generating unit 100, as illustrated in FIG. 4b, keeps outputting unlock signals and, when CLV is realized, outputs lock signals.

The microcomputer 120 outputs ON brake driving signals as illustrated in FIG. 4c when the feed motor driving signals, as illustrated in FIG. 4a, are rendered off.

Then, the microcomputer 120 cuts off OFF the output of the feed motor driving signals when the CLV is realized to thereby cause the lock signal generating unit 100 to output lock signals.

The logic means 140 performs a logic sum on the output signal of the lock signal generating unit 100 as illustrated in FIG. 4b and the output of the microcomputer 120 as illustrated in FIG. 4c to thereby output a signal as illustrated in FIG. 4d.

In other words, the unlock state is maintained until the feed motor driving signal is rendered off.

Accordingly, the brake circuit 200 maintains the lock state during the stoppage of the pickup as illustrated in FIG. 4d.

Meanwhile, when the feed motor driving signal is outputted ON as illustrated in FIG. 4a, the pickup and lens are moved as illustrated in FIGS. 4e and 4f, and when the feed motor driving signal is turned off, the pickup and lens stop moving.

At this moment, the brake circuit 200, as mentioned in the above, maintains the lock state to thereby be operated under the brake mode, so that the vibration of the lens is prevented.

Accordingly, the pickup and lens are stopped within a very short period of time T1 when the feed motor driving signal is rendered off, so that the tracking can be conducted quickly during as long as a predetermined period of time ΔT.

The early brake driving method of a disk system in accordance with the present invention comprises the steps of transmitting an unlock state to a lock state forcibly during a stoppage of a feed motor which moves the pickup from the disk to radiant directions (first step); and controlling a vibration of a lens during the stoppage of the pickup by operating the feed motor in a brake mode when the same is transitted to the lock state in the above first step (second step).

FIG. 5 is a flow chart for illustrating a brake driving method in accordance with the present invention, wherein a discrimination is made as to whether the feed motor driving signal for moving the pickup from the disk to radiant directions is rendered off, step S300.

If the discrimination result at the step S300 shows that the feed motor driving signal is rendered off, flow advances to step S400.

The unlock state is forcibly transitted to the lock state at step S400.

In other words, when the pickup is moved by the feed motor driving signal as in the case of the track seek, CLV is not realized, and the lock signal generating unit outputs unlock signal to the brake circuit to thereby release the brake mode, so that the tracking is not performed.

Then the feed motor driving signal is rendered off, and when the pickup is stopped, the microcomputer forcibly transmits unlock signals outputted from the lock signal generating unit to lock signals, so that the brake circuit is made to operate in the brake mode.

Accordingly, the vibration of the lens generating during the stoppage of the pickup is controlled, so that a fast tracking can be conducted.

Figure 6:
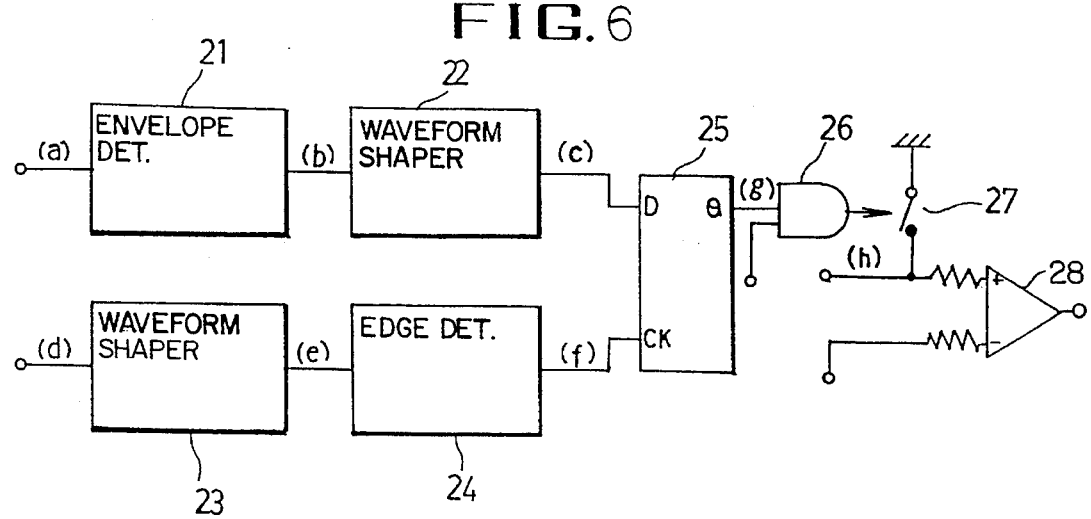
FIG. 6 is a block diagram for showing a tracking control device effecting a brake mode along with FIG. 3.

FIG. 6 is a block diagram for showing a tracking control device effecting a brake mode along with FIG. 3.

A reference numeral 21 at FIG. 6 is an envelope detecting circuit for detecting an envelope when a reproduced radio frequency RF signal is inputted.

An output detected from the envelope detecting circuit is supplied to a waveform shaper which performs a waveform shaping.

A reference numeral 23 is a waveform shaper which performs a waveform shaping on an incoming tracking error signal to thereafter output the same in a pulse signal.

A pulse signal edge waveform-shaped from the waveform shaper 23 is detected at an edge detecting circuit 24.

Figure 7A:
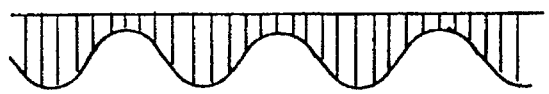
FIGS. 7a–7h and FIGS. 8a–8h are timing drawings for illustrating opeational states of FIG. 6.
Figure 7B:
Figure 7C:
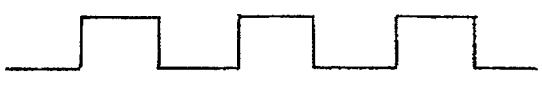

Meanwhile, when a light spot crosses the tracks from an exterior of the disk to an interior of the same, the RF signal envelope is detected-from a waveform in FIG. 7a to a waveform in FIG. 7b and is converted to a pulse signal just like a waveform illustrated in FIG. 7c.

Figure 7D:
Figure 7E:

A tracking error signal as illustrated in FIG. 7d is converted to a pulse signal as illustrated in FIG. 7e.

Figure 7F:

The edges of the above waveform are detected as illustrated in FIG. 7f.

In another example, when the light spot crosses from the interior of the disk to the exterior of the same, the waveform shapes of the signals are as per FIG. 8 (These signals are determined by the same reference characteristics as in FIG. 7)

The only difference is that FIG. 8 shows the light spot crosses the tracks from the interior of the disk to the exterior, and in this case, a phase relationslip is different between the RF signal when the light spot crosses the tracks from the exterior of the disk to the interior and the tracking error signal.

In case the light spot crosses the tracks from the exterior to the interior, the RF signal is rendered in low level according to a timing determined by a rising edge of the tracking error signal, and the RF signal is increased to high level at a declining edge of the tracking error signal.

The RF signal is changed to a reverse level of the above case when the light spot crosses the tracks from the interior of the disk to the exterior.

Figure 7G:
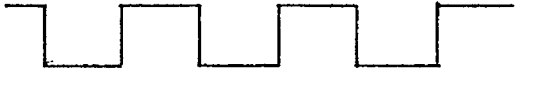
Figure 8A:
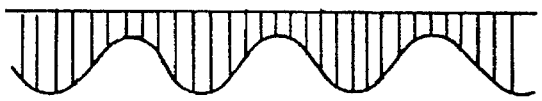
Figure 8B:
Figure 8C:
Figure 8D:
Figure 8E:
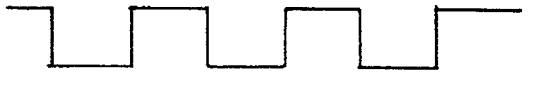
Figure 8F:
Figure 8G:

In other words, the output from the waveform shaper 22 is latched to a delay flip flop 25 in response to an output of the edge detecting circuit corresponding to a clock signal to thereby output waveforms as illustrated in FIG. 7g and FIG. 8g to an output terminal of the delay flip flop 25.

The output Q is supplied to a switch 27 through an AND gate 26 to thereby be rendered on or off.

The switch 27 is rendered on when the output of the AND gate 26 is in high levels, and when in low levels, is rendered off.

When the switch 27 is turned off, the input terminal of an amplifying circuit 28 for amplifying the tracking error signal is grounded.

Figure 7H:
Figure 8H:

In other words, only when the switch 27 is turned off, the tracking error signal is amplified to thereby be outputted (the same waveforms as illistrated in FIG. 7h or FIG. 8h)

In other words, only the power for driving the light spot to a reverse direction of the moving direction (namely, the braking power) is reproduced.

Under the brake mode, a signal of high level is inputted to the other end of an input terminal of the AND gate 26 and the aforementioned operations are conducted.

Namely, during a disk play, a signal of low level is supplied to one end of an input terminal of the AND gate 26 to thereby release the brake mode, so that the switch 27 maintains an off state.

As seen from the foregoing, the early brake driving method of a disk system and a circuit thereof in accordance with the present invention operates the brake circuit in a brake mode even during the stoppage of the pickup, so that a fast tracking can be obtained and an effect of a high speed access can be made possible.

The foregoing descriptions and drawings are illustrative and are not to be taken as limiting. Still other variations and modifications are possible without departing from the spirit and scope of the present invention.

Specifically, it should be noted that an explanation has been given about the circuit of the present invention utilizing OR gates as logic means but a combination of other gates can also accomplish the objects of the present invention.

It should be also noted that programs in the microcomputer an explained in the present invention can accomplish the aforementioned objects without utilizing the logic means.

The lock signal generating unit, brake circuit and the like mentioned here are the references just to help understand the objects of the present invention and are not intended to limit the scope of this invention.

It should be apparent that the present invention can be applied to all kinds of fields intended to conduct an early tracking.

What is claimed is:

1. A swift brake driving circuit of a disk system for track seeking comprising:

a lock signal generating unit for outputting lock signals when Constant Linear Velocity is realized and outputting unlock signals when Constant Linear Velocity is not realized;

wherein said lock signal generating unit simultaneously outputs unlock signals and feed motor driving signals in order to move an optical pickup in a radial direction of a disk during a track seek, and after a lapse of a predetermined period of time beginning from a moment that the pickup and a lens are stopped, said lock signal generating unit outputs lock signals;

a microcomputer for outputting brake signals when a said feed motor driving signal of said feed motor driving signals stops and for moving said optical pickup in the radial direction of the disk during an unlock state;

a logic means which controls a vibration of the lens by simultaneously forcing the transition of a feed motor from said unlock state to a lock state using said brake signals outputted from the microcomputer, so that the feed motor is operated in a brake mode, said unlock state being maintained until the feed motor driving signal is rendered off; and a brake circuit for maintaining the lock state during stoppage of the pickup.

2. A swift brake driving circuit of a disk system, as defined in claim 1, wherein the brake mode represents an operational state of a tracking circuit.

3. A brake circuit of a disk system as defined in claim 1, wherein the logic means comprises an OR gate having one input terminal connected to the lock signal generating unit and another input connected to the microcomputer; and wherein said OR gate drives the brake circuit to thereby be operated in said brake mode when either the lock signal is outputted from the lock signal generating unit or the brake signal is outputted from the microcomputer.

4. A swift brake driving method of a disk system for track seeking comprising the steps of:

outputting lock signals from a lock signal generating unit when Constant Linear Velocity is realized, and outputting unlock signals from said lock signal generating unit when Constant Linear Velocity is not realized;

outputting said unlock signals from said lock signal generating unit and feed motor driving signals simultaneously in order to move an optical pickup in a radial direction of a disk during a track seek;

outputting said lock signals from said lock signal generating unit after a lapse of a predetermined period of time beginning from a moment that the pickup and a lens are stopped;

outputting brake signals from a microcomputer when a said feed motor driving signal of said feed motor driving signals stops;

moving said optical pickup in the radial direction of the disk during an unlock state;

controlling a vibration of the lens by simultaneously forcing the transition of a feed motor from said unlock state to a lock state using said brake signals outputted from the microcomputer, so that the feed motor is operated in a brake mode, said unlock state being maintained until the feed motor driving signal is rendered off; and maintaining the lock state, using a brake circuit, during stoppage of the pickup.

5. A swift brake driving method of a disk system as defined in claim 4, wherein the brake mode represents an operational state of a tracking circuit.

6. A swift brake driving method of a disk system as defined in claim 4, wherein the brake circuit is operated in said brake mode when either the lock signal is being outputted from the lock signal generating unit or the brake signal is being outputted from the microcomputer.

* * * * *